(12) United States Patent
McAuliffe

(10) Patent No.: US 7,494,304 B2
(45) Date of Patent: Feb. 24, 2009

(54) TOOL HOLDER WITH REMOVABLE HANDLE

(75) Inventor: Patrick M. McAuliffe, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 72 days.

(21) Appl. No.: 11/511,913

(22) Filed: Aug. 29, 2006

(65) Prior Publication Data

US 2008/0056834 A1 Mar. 6, 2008

(51) Int. Cl.
*B23G 1/26* (2006.01)
(52) U.S. Cl. .................... 408/240; 81/177.5; 408/124
(58) Field of Classification Search ............... 408/120, 408/121, 122, 123, 122.5, 124, 240, 241 R, 408/239 R; 81/177.5, 177.1, 177.8, 177.85, 81/489; *B23G 1/26*
See application file for complete search history.

(56) References Cited

U.S. PATENT DOCUMENTS

| 192,423 | A | * | 6/1877 | Elterich ................... 408/240 |
| 1,132,319 | A | * | 3/1915 | Fegley ...................... 81/62 |
| 2,756,060 | A | * | 7/1956 | Tomchek ................... 279/14 |
| 2,793,377 | A | * | 5/1957 | Ashton ..................... 408/234 |
| 3,738,768 | A | | 6/1973 | Kuhn |
| 4,087,195 | A | * | 5/1978 | Wood ....................... 408/240 |
| 4,097,182 | A | * | 6/1978 | Rolnick ................... 408/239 R |
| 4,687,384 | A | | 8/1987 | McCoy |
| 4,818,158 | A | * | 4/1989 | Munroe ................... 408/241 R |
| 6,055,889 | A | * | 5/2000 | Rinner ..................... 81/177.85 |
| 6,378,402 | B1 | * | 4/2002 | Kalomeris et al. ......... 81/177.5 |
| 6,807,883 | B1 | * | 10/2004 | Rinner ..................... 81/177.5 |
| 6,945,145 | B1 | | 9/2005 | Kesinger |
| 7,007,574 | B1 | * | 3/2006 | Wu ......................... 81/177.85 |
| 7,228,766 | B1 | * | 6/2007 | Shyu ....................... 81/177.1 |
| 2005/0274233 | A1 | * | 12/2005 | Lin ......................... 81/177.5 |
| 2007/0199412 | A1 | * | 8/2007 | Lee ......................... 81/177.85 |

FOREIGN PATENT DOCUMENTS

SU 1675066 A1 * 9/1991

* cited by examiner

*Primary Examiner*—Daniel W Howell
(74) *Attorney, Agent, or Firm*—Greer, Burns & Crain, Ltd.

(57) ABSTRACT

A tool holder comprises an elongated body having a first end portion for receiving a handle and a second end portion with an adjustable tool retaining mechanism for holding a tool, an elongated handle releasably retained in the first end portion and being configured to be slideable between stop positions at opposite ends, and a release mechanism at the first end portion configured to enable the handle to be separated from the body when operated.

23 Claims, 3 Drawing Sheets

TOOL HOLDER WITH REMOVABLE HANDLE

BACKGROUND OF THE INVENTION

The present invention generally relates to hand tools. More particularly, the invention relates to a tool holder for holding tools such as a tap for cutting threads in the walls of an opening in a work pieces.

Such tools are also commonly referred to as tap wrenches and a common design of tap wrenches have a cylindrical handle that slides back and forth to allow its use in tight spaces. This requires the user to slide the handle approximately every half turn, which is not an issue when the handle is needed for leverage but when removing the tap little leverages needed and sliding the handle back and forth becomes cumbersome. The capability of removing the handle completely allows the user to spin the assembly relatively easily during the removal. However, as the handle is easily removable, it may slide out of the body and fall to some inconvenient location.

SUMMARY OF THE INVENTION

A tool holder comprises an elongated body having a first end portion for receiving a handle and a second end portion with an adjustable tool retaining mechanism for holding a tool, an elongated handle releasable retained in the first end portion and being configured to be slideable between stop positions at opposite ends, and a release mechanism at the first end portion configured to enable the handle to be separated from the body when operated.

DESCRIPTION OF THE PREFERRED EMBODIMENTS

Figure 1:
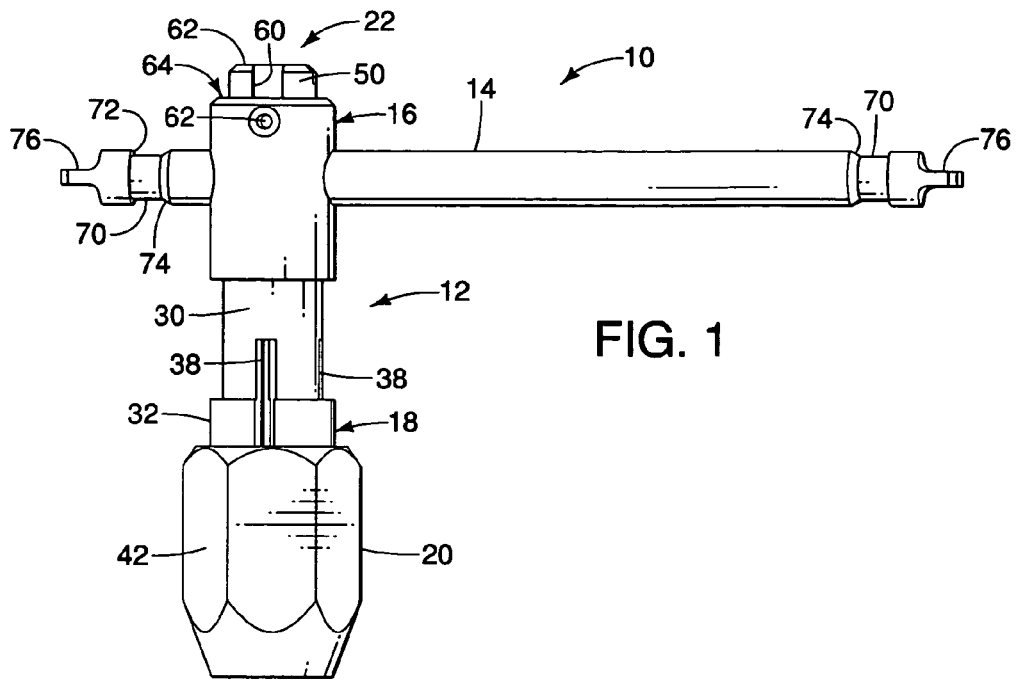
FIG. 1 is a side view of the preferred embodiment of the tool holder.

Broadly stated, the various embodiments of the tool holder of the present invention have a T-handle-type tool holder configuration that has a slideable handle that fits in the body of the tool holder. The tool holder is designed to have stops at opposite ends so that the handle will not be separated from the body during normal operation, but which can be removed when desired by a user. This is accomplished by a release mechanism that when operated permits the handle to be separated from the body. It is accomplished by a pushing an exposed end portion at the top of the body that enables the handle to be pulled out of the body.

This facilitates easy removal of the tool holder after threads have been cut in an opening and the tap needs to be backed out of the opening. Since very little resistance to such unthreading action is generally experienced, it can almost be spun out of the opening. An advantage of the embodiments of the present invention is that the top of the exposed end portion is provided with a slot, or other noncircular recess that can cooperate with a complementary end portion of the elongated handle so that the end of the handle can be separated from the body and be used to engage the end portion and spin the body to back out the tap after a thread making operation has been completed.

Turning now to the drawings, and particularly FIGS. 1 through 5, the preferred embodiment of the tool holder is indicated generally at 10 which has a generally cylindrical body, indicated generally at 12, and an elongated handle 14 that is removable attached to an upper end portion 16 of the body 12. A lower end portion 18 has a tool retaining mechanism 20 for holding a cutting tap (not shown) and a release mechanism, indicated generally at 22.

Figure 2:
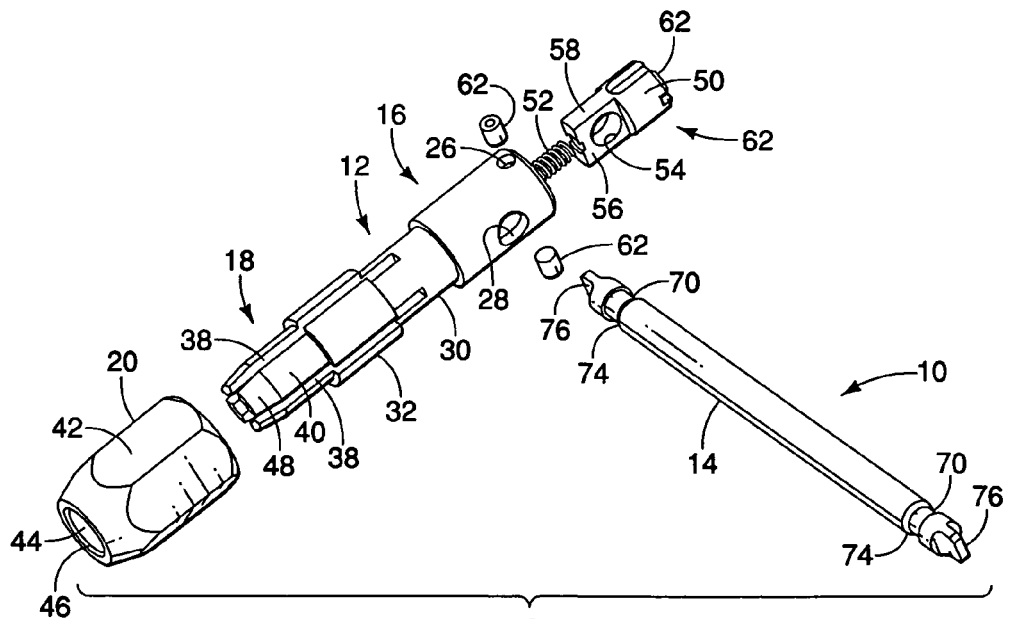
FIG. 2 is an exploded perspective view of the tool holder shown in FIG. 1.
Figure 3:
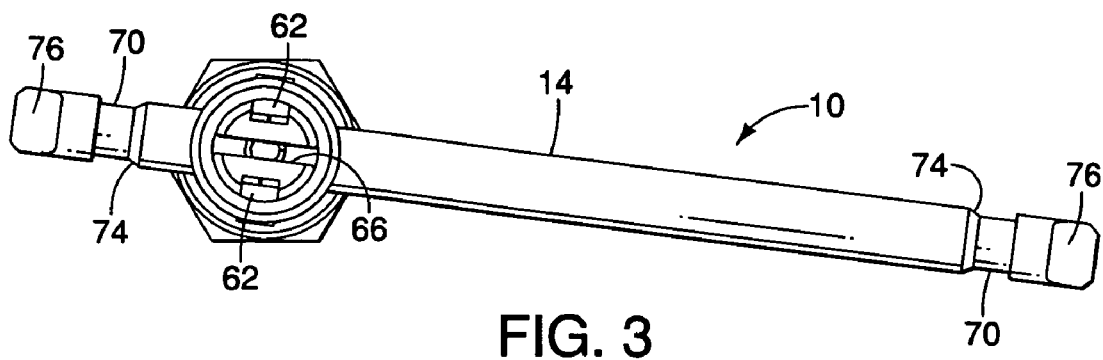
FIG. 3 is a top view of the preferred embodiment shown in FIG. 1.
Figure 4:
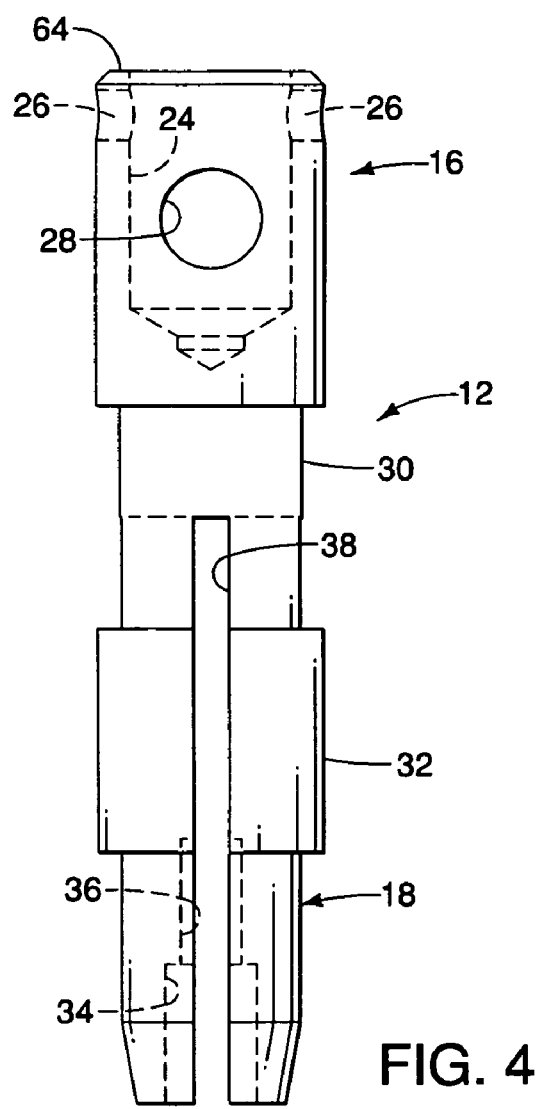
FIG. 4 is a view of the body of the embodiment shown in FIG. 1 shown from either the front or the back thereof.
Figure 5:
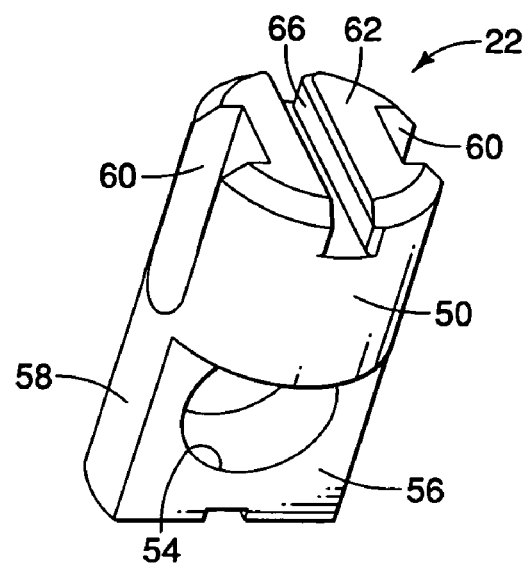
FIG. 5 is a perspective view of the portion of the release mechanism of the embodiment shown in FIG. 1.

As is best shown in FIGS. 1, 2 and 4, the body 12 has an elongated generally cylindrical shape, with a cylindrical opening 24 in its upper end portion 16. Small openings 26 in the cylindrical wall provide access to the opening 24, as do larger openings 28 which are sized to receive the handle 14. The body 12 has a reduced diameter central portion 30 with an enlarged threaded portion 32 (the threads not being shown) that cooperates with the tool retaining mechanism 20. The lower end portion 18 has a hollow interior chamber 34 for receiving cutting tap (not shown). The chamber 34 has a smaller diameter extension 36 for receiving the end of a tap tool and the center portion 30 and lower portion 18 have transverse slots 38 which define four flexible jaws 40 that are configured to retain a cutting tap placed in the chamber 34 when the tool retaining mechanism 20 is tightened. In this regard, the mechanism 20 is in the form of a collet nut having hexagonal faces 42, an internally threaded opening 44 that is inwardly tapered toward its nose end 46. This cooperates with a tapered end portion 48 on each jaw, which when the collet is tightened, forces the jaws toward one another to hold the tap in place.

As is best shown in FIGS. 1 and 2, the release mechanism 22 principally comprises a stop member 50 and a spring 52, both of which fit within the opening 24 of the body 12. As shown in the enlarged perspective view of FIG. 5, the stop member 50 has an opening 54 that is preferably approximately the same size as the opening 28, i.e., it is sized to receive the handle 14. The lower half of the stop member has portions of the cylindrical shape removed on opposite sides to present flat faces 56 on opposite sides of a relatively thin remaining portion 58. The thickness of the portion 58 is sized to cooperate with a reduced diameter portion of the handle 14 to limit the sliding movement of the handle 14 relative to the body during normal operation.

The stop member 50 has axially directed recesses 60 on opposite sides thereof which cooperate with set screws 62 that are screwed into the openings 26 and are sized to extend inwardly into the opening 24 and penetrate into the recesses 60 for limiting the outward movement of the stop member caused by the biasing force applied by the spring 52. Importantly, the set screws 62 also prevent rotation of the stop member relative to the body 12 so that the opening 54 maintains its alignment with opening 28 in the body enabling the handle 14 to be inserted and removed from the body 12.

It should be understood that other fastening techniques and mechanisms could be used other than set screws. For example, dowel pins or roll pins could be used, and it is possible that the body could be crimped or staked to form a protrusion instead of using pins, screws or the like.

The length of the recesses 60 is preferably such that a top surface 62 of the stop member 50 extends outwardly beyond an end surface 64 of the body as shown in FIG. 1 which facilitates easy manipulation by a user to separate the handle 14 from the body 12. The stop member 50 also has a slot 66 in the outer end thereof for receiving a complementary configured end portion of the handle 14.

The handle 14 has a reduced diameter portion 70 located at opposite ends thereof with the outer portion terminating in a transverse shoulder 72 and the inner end portion terminating in a ramped or inclined annular surface 74. The length of the reduced diameter portion 70 is preferably greater than the thickness of the portion 58 of the stop member 50 so that when the handle 14 is pulled in either direction, when the reduced diameter portion 70 is co-extensive with the portion 58, one of the faces 56 will engage the transverse shoulder 72 and prevent the handle from being completely removed from the body 12. This happens because the spring 52 acts to push the stop member 50 outwardly.

While the handle 14 cannot be removed from the body 12, it can be moved in the opposite direction at which time the stop member 50 can ride up the ramped or inclined portion 74. This is achieved with only a slight increase in force necessary to overcome the force applied by the spring 52. The outer ends of the handle 14 have a flat blade 76 which is sized to fit in the slot 66 of the stop member 50. If the handle 14 is to be removed from the body 12, the user merely presses on the top surface 62 of the stop member 50 so that the opening 54 is generally aligned with the handle and enables the transverse shoulder 72 to be cleared and the handle can be pulled further to separate it from the body 12. If a thread making operation is completed and the tap is to be backed out of the newly threaded hole, the blade 76 can be inserted into the slot 66 if desired in order to facilitate rapid and easy removal of the tap.

Figure 6:
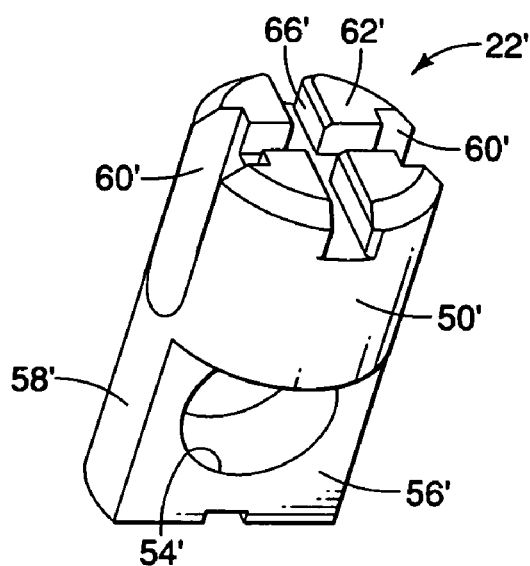
FIG. 6 is an alternative embodiment of the portion of the release mechanism shown in FIG. 5.
Figure 7:
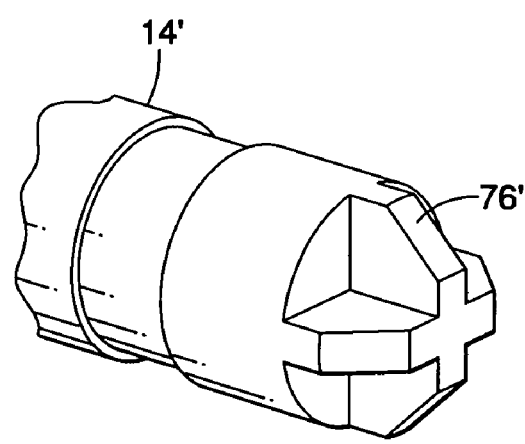
FIG. 7 is an alternative embodiment of the elongated handle, particularly illustrating a Philips-type end configuration.

It should be understood that the blade and single slot configuration of the preferred embodiment can be modified by using any of many other complementary noncircular configurations, such as the Philips type end portion 76' shown in FIG. 7 which cooperates with an alternative cross-shaped recess 66' as shown in FIG. 6. It should be understood that other configurations such as an oval, star, box or hex configuration could be used if desired. In the alternative embodiments, numbers having a prime designation are intended to be similar to the parts that have been described with the same number corresponding to the preferred embodiment.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A tool holder comprising:
   an elongated body having a first end portion for receiving a handle and a second end portion with an adjustable tool retaining mechanism for holding a tool;
   an elongated handle releasably retained in said first end portion and being configured to be slideable between stop configurations at opposite ends;
   a release mechanism at said first end portion configured to enable said handle to be separated from said body when operated;
   wherein said handle has a generally transverse surface at each end portion thereof, said release mechanism having a stop member with an opening through which said handle can pass, said stop member having at least one stop surface configured to engage one of said handle transverse surfaces when said handle is selectively moved to one of said stop configurations.

2. A tool holder as defined in claim 1 wherein said stop member has at least one elongated recess in an outer wall for receiving at least one protrusion from said body that permits limited movement of said stop member in the lengthwise direction relative to said body while prohibiting rotational movement relative thereto.

3. A tool holder as defined in claim 2 wherein said protrusion is a set screw extending inwardly of said body.

4. A tool holder as defined in claim 1 wherein said release mechanism comprises an operating surface for moving said stop member to disengage said stop surface from said handle transverse surface and permitting separation of said handle from said body.

5. A tool holder as defined in claim 4 wherein said handle is cylindrical and has an reduced diameter annular groove at each end defining said transverse surface, said stop member extending exteriorly of said first end portion and presenting said operating surface.

6. A tool bolder as defined in claim 5 wherein said stop member is moveable in said first end portion of said body and is biased in said exterior direction, said at least one stop surface normally engaging one of said handle transverse surface when said handle is moved to one of said stop configurations, moving said stop member downwardly responsive to depressing said operating surface disengaging said stop surface from said handle annular groove transverse surface permitting separation of said handle from said body.

7. A tool holder as defined in claim 6 wherein said stop member is cylindrically shaped and is located in a cylindrically shaped recess in said first end portion of said body, said tool holder having a spring located between the body and the bottom of said stop member for biasing said stop member exteriorly of said body.

8. A tool holder as defined in claim 7 wherein said stop member is configured to prevent rotation thereof relative to said body.

9. A tool holder comprising:
   an elongated body having a first end portion for receiving a handle and a second end portion with an adjustable tool retaining mechanism for holding a tool;
   an elongated handle releasably retained in said first end portion and being configured to be slideable between stop configurations at opposite ends;
   a release mechanism at said first end portion configured to enable said handle to be separated from said body when operated;
   wherein said handle has a non-circular configuration on at least one end portion and said body has a mating configuration at its top end portion for receiving said handle configuration, thereby enabling said handle to apply a turning force to said body when mated.

10. A tool holder as defined in claim 9 wherein said body mating configuration is located on said release mechanism.

11. A tool holder as defined in claim 10 wherein said handle non-circular configuration is one of a hexagonal key, Phillips or standard screwdriver, and said body mating configuration is a hexagonal slot, Phillips head or simple slot, respectively.

12. A T-handle type tool holder, comprising:
   an elongated body having a tool retaining mechanism at a bottom end portion and a handle retaining mechanism at a top end portion;

an elongated handle slideable in said handle retaining mechanism between stop configurations at opposite ends of said handle;

said handle retaining mechanism permitting said handle to be separated from said body responsive to user manipulation;

wherein said handle has a generally transverse surface at each end portion thereof, said handle retaining mechanism having a stop member with an opening through which said handle can pass, said stop member having at least one stop surface configured to engage one of said handle transverse surfaces when said handle is selectively moved to one of said stop configurations.

13. A T-handle type tool holder as defined in claim 12 wherein said stop member has at least one elongated recess m an outer wall for receiving at least one protrusion from said body that permits limited movement of said stop member in the lengthwise direction relative to said body while prohibiting rotational movement relative thereto.

14. A T-handle type tool holder as defined in claim 13 wherein said protrusion is a set screw extending inwardly of said body, 15. A T-handle type tool holder as defined in claim 12 wherein said handle retaining mechanism comprises an operating surface for moving said stop member to disengage said stop surface from said handle transverse surface and permitting separation of said handle from said body.

16. A T-handle type tool holder as defined in claim 15 wherein said handle is cylindrical and has an reduced diameter annular groove at each end defining said transverse surface, said stop member extending exteriorly of said first end portion and presenting said operating surface.

17. A T-handle type tool holder, comprising:
an elongated body having a tool retaining mechanism at a bottom end portion and a handle retaining mechanism at a top end portion;

an elongated handle slideable in said handle retaining mechanism between stop configurations at opposite ends of said handle;

said handle retaining mechanism permitting said handle to be separated from said body responsive to user manipulation;

wherein said handle has a non-circular configuration on at least one end portion and said body has a mating configuration at its top end portion for receiving said handle configuration, thereby enabling said handle to apply a turning force to said body when mated.

18. A T-handle type tool holder as defined in claim 17 wherein said body mating configuration is located on said handle retaining mechanism.

19. A T-type tap wrench comprising:
a generally cylindrical body having a tool retaining mechanism at one end and a handle retaining mechanism at the other end;

a handle configured to slide in said handle retaining mechanism between stop configurations at opposite ends;

said handle retaining mechanism having a member for permitting separation of said handle from said handle retaining mechanism responsive to user manipulation;

wherein said handle has a generally transverse surface at each end portion thereof, said handle retaining mechanism having a stop member with an opening through which said handle can pass, said stop member having at least one stop surface configured to engage one of said handle transverse surfaces when said handle is selectively moved to one of said stop configurations, 20. A T-type tap wrench as defined in claim 19 wherein said handle retaining mechanism comprises an operating surface for moving said stop member to disengage said stop surface from said handle transverse surface and permitting separation of said handle from said body.

21. A T-type tap wrench as defined in claim 20 wherein said handle is cylindrical and has an reduced diameter annular groove at each end defining said transverse surface, said stop member extending exteriorly of said first end portion and presenting said operating surface.

22. A T-type tap wrench as defined in claim 19 wherein said handle has a non-circular configuration on at least one end portion and said body has a mating configuration at its top end portion for receiving said handle configuration, thereby enabling said handle to apply a turning force to said body when mated.

23. A T-type tap wrench as defined in claim 22 wherein said body mating configuration is located on said retaining mechanism.

* * * * *